(12) United States Patent
Reisinger et al.

(10) Patent No.: US 8,131,414 B2
(45) Date of Patent: Mar. 6, 2012

(54) ENERGY SUPPLY SYSTEM AND ENERGY SUPPLY METHOD FOR VEHICLE SUBSYSTEMS

(75) Inventors: Karl Reisinger, Graz (AT); Helmut Reicht, Paldau (AT); Robert Harkam, Deutschlandsberg (AT); Friedrich Hipp, Graz (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 557 days.

(21) Appl. No.: 12/273,024

(22) Filed: Nov. 18, 2008

(65) Prior Publication Data

US 2009/0134846 A1 May 28, 2009

(30) Foreign Application Priority Data

Nov. 19, 2007 (DE) .......................... 10 2007 055 218

(51) Int. Cl.
*B60L 11/00* (2006.01)

(52) U.S. Cl. .......................................... 701/22; 701/115

(58) Field of Classification Search .................... 701/22, 701/115, 99; 477/107, 110, 3, 5, 7, 8; 322/7, 322/15, 23, 28; 180/65.285, 65.265
See application file for complete search history.

(56) References Cited

U.S. PATENT DOCUMENTS

| | | | |
|---|---|---|---|
| 5,287,022 A * | 2/1994 | Wilsher | 327/310 |
| 6,208,931 B1 * | 3/2001 | Schoettle et al. | 701/115 |
| 7,032,733 B2 * | 4/2006 | Parigger | 192/84.6 |
| 7,812,468 B2 * | 10/2010 | Kuroda et al. | 290/40 C |
| 2003/0197991 A1 * | 10/2003 | Kahlon et al. | 361/90 |
| 2005/0110460 A1 * | 5/2005 | Arai et al. | 320/116 |
| 2006/0036357 A1 * | 2/2006 | Isono et al. | 701/22 |
| 2006/0152084 A1 * | 7/2006 | Tupman et al. | 307/64 |
| 2006/0202582 A1 * | 9/2006 | Umesaki et al. | 310/162 |
| 2007/0001732 A1 * | 1/2007 | Branch et al. | 327/218 |
| 2009/0118962 A1 * | 5/2009 | Heap et al. | 701/99 |

FOREIGN PATENT DOCUMENTS

| | | |
|---|---|---|
| DE | 197 10 082 A1 | 1/1998 |
| DE | 601 16 919 T2 | 9/2006 |
| DE | 10 2006 000 346 | 2/2007 |
| DE | 103 09 326 B4 | 8/2007 |

* cited by examiner

*Primary Examiner* — Thomas Black
*Assistant Examiner* — Marthe Marc-Coleman
(74) *Attorney, Agent, or Firm* — Harness, Dickey & Pierce, P.L.C.

(57) ABSTRACT

An energy supply system for electrical actuator of a motor vehicle having a engine and battery includes a generator adapted to be driven by the vehicle engine to provide electrical energy to the electric actuator and vehicle battery. A control unit sets an input power provided to the generator by the vehicle engine and is configured to set the output voltage of the generator based on a power request associated with the electric actuator. A method for supplying electrical energy to a vehicle subsystem may be performed using an energy supply system as disclosed.

12 Claims, 1 Drawing Sheet

ENERGY SUPPLY SYSTEM AND ENERGY SUPPLY METHOD FOR VEHICLE SUBSYSTEMS

CROSS-REFERENCE TO RELATED APPLICATIONS

Figure 1:
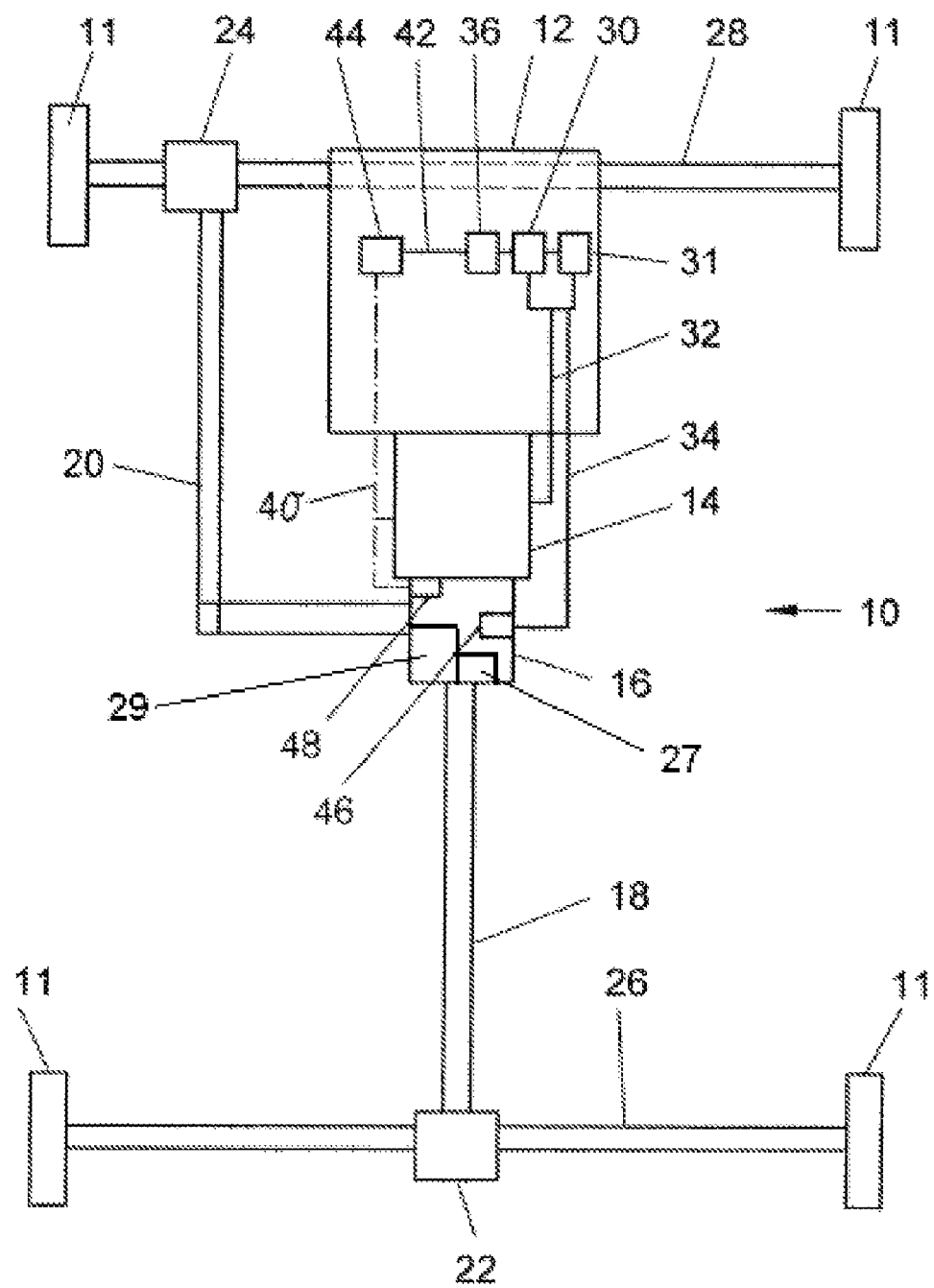

This application claims the benefit and priority of German Application Number DE 10 2007 055 218.3, filed Nov. 19, 2007. The entire disclosure of the above application is incorporated herein by reference.

FIELD

The invention relates to an energy supply system for vehicle subsystems of a motor vehicle having a generator driven by the vehicle engine for the provision of electrical energy to at least one vehicle subsystem and/or for the charging of a vehicle battery and of a control unit for the setting of the input power provided to the generator by the vehicle engine and to a corresponding method for the supply of vehicle sub systems with electrical energy.

BACKGROUND

A generator called an alternator is provided in motor vehicles and supplies the electrical devices on board with energy and charges the vehicle battery. The alternator serves for the conversion of mechanical energy into electrical energy, with the required mechanical power being provided by the vehicle engine. With a running engine, the consumers are e.g. supplied directly with the power provided by the alternator. If the electrical power required in the vehicle is higher due to the switched-on consumers, the additionally required electrical power is e.g. taken from the vehicle battery. If the electrical power required by the vehicle is lower than the electrical power provided by the alternator, the surplus power is e.g. used to charge the battery.

Due to increasing electrification and automation, the number of the consumers to be supplied by the onboard network of the motor vehicle in this manner has greatly increased in recent times. Possible consumers are electrical controls, servo motors, air conditioning units, auxiliary heaters, main vehicle transmissions or transfer cases in all-wheel drive vehicles.

To be able to satisfy the increasing demands on the electrification in automotive construction without allowing the battery and alternator capacity to increase too much, energy management systems can be used which, on the one hand, allow the recovery of braking energy during thrust or brake phases of the vehicle. In such phases, the vehicle drives the alternator via the engine without fuel consumption, the alternator thereby producing more power than being consumed at that time as the case may be. This surplus energy is stored in the battery. On the other hand, such energy management systems can also be configured such that on a larger power demand for driving the vehicle, that is e.g. during acceleration phases, a greater portion of the energy supplied by the engine is used solely for driving the vehicle. The alternator is not active during such a phase and electrical consumers are only supplied via the battery. The alternator only becomes active again when the increased power demand for the driving of the vehicle is terminated.

Fluctuations in the onboard voltage can occur due to this regulation of the alternator. Fluctuations occur e.g. in the magnitude of 10.5 to 16V when the onboard voltage as a rule amounts to 13.5V.

When the onboard voltage of the vehicle falls below a nominal value, losses or larger setting times can be anticipated if e.g. an electrical actuator with a greater setting torque has to be switched, such as the actuator of the transmission.

This problem can be combated in part in that the power cross-sections with which the controllers and/or actuators are supplied can be enlarged or the inner resistances of the controllers can be reduced. In this manner, the voltage drop between the energy supply unit, that is the alternator or the vehicle battery, and the controller or the actuator is smaller. Higher weight to be moved and higher costs in particular arise due to the higher power cross-sections.

SUMMARY

It is the object of the present invention to provide an energy supply system for vehicle subsystems and a method for the supply of vehicle subsystems with electrical energy which allow the desired satisfaction of power demands of vehicle subsystems in a cost-effective manner even with fluctuating onboard voltage.

This object is satisfied by an energy supply system having the features of claim 1 or claim 5 or by a method for the supply of vehicle subsystems with electrical energy having the features of claim 17. Dependent claims are directed to preferred embodiments.

An energy supply system in accordance with the invention in particular has an interface for the connection of the at least one vehicle subsystem to the control unit which serves for the setting of the input power provided to the generator by the vehicle engine. The vehicle engine otherwise serves for the driving of the vehicle, optionally in combination with other motors, and preferably comprises an internal combustion engine. Power request signals of the at least one vehicle subsystem can be transferred to the control unit via the interface. In accordance with the invention, the control unit is configured such that it sets the output voltage of the generator on a power request of a vehicle subsystem such that the then current power request can be satisfied.

If e.g. the then current onboard voltage of the motor vehicle is not sufficient to set a torque with a high threshold value (e.g. 800 Nm), a corresponding power request signal is sent to the control unit which increases the output voltage of the generator so that sufficient electrical energy can be delivered to the vehicle subsystem for the torque to be provided sufficiently fast.

The increase in the output voltage of the generator can be brought about by the control unit e.g. in that a larger portion of the power supplied by the vehicle engine—optionally while simultaneously reducing the power of the vehicle engine provided for the driving of the vehicle—is delivered to the generator. Alternatively, the power of the vehicle engine can e.g. briefly be set high, with the power increase not being used for the driving of the vehicle, but for the increase in the generator power.

High power requests from vehicle subsystems arise e.g. when transmissions should be switched. Transmissions are actuated with the help of transmission actuators which serve e.g. for the engagement of the gears which provide the desired gear ratio. The actuators are operated with electrical energy. High energy requests on the onboard network of the motor vehicle briefly arise during such a switching procedure. To be able to carry out the switching procedure sufficiently fast, the voltage provided must be sufficiently high. In a preferred aspect of the energy supply system in accordance with the invention, the at least one vehicle subsystem correspondingly comprises at least one transmission which is configured such that it sends a power request signal to the control unit via the interface when a switching procedure should be carried out and the then current onboard voltage of the vehicle is not sufficient to provide a sufficient voltage at the transmission to carry out the switching procedure as requested.

If a corresponding switching procedure should be carried out and if the onboard voltage is just at a low level, the transmission or the actuator of the transmission can send a power request signal to the control unit of the generator via the interface. The control unit increases the input power provided to the generator so that the output voltage of the generator increases to be able to satisfy the power request.

The transmission to be switched can e.g. be an automatic main vehicle transmission. In a preferred application, the at least one vehicle subsystem comprises a transfer case of an all-wheel drive vehicle with which the input power of the vehicle engine is transferred as required to the axles of the all-wheel drive vehicle. With such a transfer case, at least one electrical actuator is provided to variably actuate a friction clutch. Such a transfer case having an electrical actuator is known, for example, from U.S. Pat. No. 7,032,733 B2 whose content is herewith included in the disclosure content of the present application.

A voltage measuring device is advantageously provided to determine whether the then current voltage of the onboard network of the motor vehicle is sufficient for the desired carrying e.g. of the switching procedure of a transmission. It can e.g. be provided directly at the generator to be able to determine its output voltage at the then current time. In a preferred further development, the voltage applied to the respective vehicle subsystem is measured which does not necessarily have to coincide with the output voltage of the generator—e.g. due to the power resistances. If e.g. a transmission should be switched and if a corresponding switch signal is received at the transmission actuator, a check is made with the help of the voltage measuring device whether the input voltage then currently applied to the transmission actuator is sufficient to be able to carry out the switching procedure sufficiently fast. If this voltage is below a corresponding threshold value, a power request signal is sent to the control unit of the generator via the interface. A comparator device is preferably associated with the voltage measuring device for the purpose of the named check of the input voltage to compare the input voltage applied to the transmission actuator to a threshold value.

Alternatively to the named voltage measuring device, the respective vehicle subsystem (e.g. transfer case) can have a comparator device which compares a value of the then current onboard voltage of the vehicle received via a data interface of the vehicle subsystem with a threshold value. Depending on the result of this comparison (i.e. if a corresponding requirement is determined), the vehicle subsystem transmits a power request signal to the control unit so that the output voltage of the generator is increased. The data interface can be formed by the already named interface for the connection of the vehicle subsystem to the control unit or it can be a separate interface. The named value of the then current onboard voltage of the vehicle can in particular be received via a data bus of the vehicle (e.g. CAN bus). The named threshold value can be stored in a memory associated with the comparator device.

It is in particular advantageous when a plurality of vehicle subsystems should be supplied with the help of the energy supply system in accordance with the invention if a bus interface is used which allows the connection of a plurality of vehicle subsystems to the controller without individual cable connections being used between each individual vehicle subsystem and the control unit. The use of a CAN bus interface is particularly advantageous.

In a further development of the energy supply system in accordance with the invention, the control unit is configured such that it makes a determination in dependence on the vehicle state whether a power request signal is to be expected from a vehicle subsystem and optionally sets the output voltage of the generator such that the power request to be expected can be satisfied. It is additionally ensured in this manner that the power request can be satisfied fast, that is a switching procedure of a transmission can e.g. be carried out without any great setting delay. For example, with a set offroad gear ratio, it can be assumed that an offroad use of the vehicle is impending and a switching of the transfer case will become necessary to transfer the input power differently to the rear axle or front axle.

An embodiment is particularly advantageous in which a control unit is used for the control unit configured in accordance with the invention which—if no then current power request of a vehicle subsystem is present—sets the input power provided to the generator in dependence on the vehicle state, preferably in dependence on the then currently required power for the driving of the vehicle. This ensures an optimum and economical utilization of the power provided by the vehicle engine for the driving of the vehicle or for the supply of the vehicle subsystems.

In a method in accordance with the invention for the supply of vehicle subsystems with electrical energy, a vehicle subsystem sends a power request signal to a control unit of a generator when the then currently prevailing onboard voltage of the vehicle is not sufficient for a desired action of the vehicle subsystem. A control unit sets the output voltage of the generator such that it can satisfy the then current power request of the vehicle subsystem. It can be taken into account in this respect that the output voltage of the generator does not correspond to the input voltage applied to the vehicle subsystem, e.g. due to power resistances. The advantages of the method in accordance with the invention result in an analog manner from the above description of the energy supply system in accordance with the invention.

Advantageous aspects of the method in accordance with the invention and their advantages likewise result from the above description of the advantageous embodiments of the energy supply system in accordance with the invention and their advantages.

DRAWINGS

The invention will be explained by way of example in the following with reference to FIG. 1 which shows the use of an embodiment in accordance with the invention.

DETAILED DESCRIPTION

FIG. 1 shows the use of the energy supply system in accordance with the invention for the example of an all-wheel drive vehicle, with the observed vehicle subsystems being a main vehicle transmission 14 and a transfer case 16 of an all-wheel drive vehicle 10. These two transmissions are only set forth by way of example as vehicle subsystems which are supplied by the energy supply system in accordance with the invention. Additional vehicle subsystems not shown in the FIGURE which can likewise be connected to the energy supply system e.g. include the air conditioning, the heating, heatable panes, actuator motors such as window regulator motors, etc.

In FIG. 1, the vehicle 10 is shown schematically in which an internal combustion engine 12 drives the wheels 11. A vehicle is shown by way of example having a front engine which drives a rear axle 26 via a Cardan shaft 18 and a differential 22. The output of the engine 12 is connected to the main vehicle transmission 14, which can e.g. be an automatic transmission, and converts the torque of the engine in a manner known per se.

The transfer case 16 which transfers the input power between rear axle 26 and a front axle 28 of the all-wheel drive vehicle adjoins the main vehicle transmission. For this purpose, a corresponding portion of the input power is provided at the transfer case 16 to the front axle 28 via a Cardan shaft 20 and a differential 24. Transfer case 16 includes an electrical actuator 27 provided to variably actuate a friction clutch 29.

A generator or alternator 30 is provided at the engine 12 and is likewise driven by the engine 12. The portion of the input power provided by the vehicle engine for the operation of the alternator 30 is set with the help of a control unit 36 which, for example, includes a correspondingly programmed microprocessor.

A vehicle battery 31 is connected to the alternator 30. The vehicle battery 31 and the alternator 30 are connected via power supply cables 32, 34 to the main vehicle transmission 14 and to the transfer case 16 so that electrical energy is available for their switching. The main vehicle transmission 14 and the transfer case 16 are connected via a CAN (controller area network) bus to a CAN interface 44 which is e.g. connected to the control unit 36 via a signal line 42.

The embodiment shown of the energy supply system in accordance with the invention can be used as follows.

If e.g. the transfer case 16 should be switched to change the transfer of the input power of the vehicle engine 12 between the front axle 28 and the rear axle 26, a check is made whether the voltage of the onboard network is sufficient to provide a sufficient input voltage to carry out the corresponding switching procedure at the desired setting speed. If this is not the case, a power request signal is sent by the transfer case 16 via a bus connection 40 to the interface 44 and is forwarded to the control unit 36.

Too low an onboard voltage can e.g. arise in that the total input power of the vehicle engine 12 is then currently used for the driving of the vehicle 10, that is e.g. during an acceleration phase. However, a larger portion of the input power provided by the vehicle engine 12 is used by the control unit 36 in response to the power request of the transfer case 16 for the drive of the alternator 30, where necessary at the cost of the power provided for the driving of the vehicle. It is ensured in this manner that the switching procedure of the transfer case 16 is carried out without any too large a setting delay. After carrying out the switching procedure, the increased power supply to the alternator 30 can be set back again, e.g. triggered by a corresponding termination signal, so that in turn a larger portion of the power of the engine 12 is provided for the driving of the vehicle.

The transfer case 16 can have a voltage measuring device 46 to check whether the voltage of the onboard network is sufficient for the desired setting speed in the transfer case 16. The voltage measuring device 46 measures the voltage then currently applied to the connector of the power supply cable 34 and compares it with a preset threshold value. If the measured voltage is beneath the threshold value, the transfer case 16 transmits the already explained power request signal to the control unit 36. In this respect, the amount of the deviation of the measured voltage from the threshold value can be taken into account, i.e. the power request signal can be selected to be proportional to the deviation. The measured voltage can also be compared with a plurality of threshold values, with the power request signal being dependent on the threshold value not reached.

Alternatively to the use of a separate voltage measuring device 46, the transfer case 16 can have a comparator device 48 which compares a value of the then current onboard voltage of the vehicle received via the CAN bus 40 with a threshold value (or with a plurality of threshold values). Depending on the result of this comparison, the transfer case 16 transfers the already explained power request signal to the control unit 36.

In an alternative embodiment, the control unit 36 does not respond, or does not only respond, to a then current power request signal, but to a permanent power request signal. The driving situation or the parameters set by the driver can, for example, be evaluated to determine the probability of a switch procedure with a high setting torque. If e.g. the transfer case 16 is in the offroad gear ratio, the use offroad is probable and a switching procedure of the transfer case is probable for the change of the division of the input power of the vehicle engine 12 to the front axle 28 or to the rear axle 26. In such a state, the control unit 36 can also set the input power of the vehicle engine 12 provided to the alternator 30 correspondingly high even without an already acutely impending switching procedure so that the switching procedure can take place without problem and fast when it should be carried out.

Corresponding measures such as described above for the transfer case 16 can also be provided for the main transmission 14.

Although this specification makes extensive reference to an alternator, it will be understood that this is just one form of generator and that the invention is equally applicable to other forms of generator, for example, to a dynamo; i.e. the term covers all forms of DC power generators, AC power generators, 3-phase power generators, etc.

What is claimed is:

1. An energy supply system for an electrically operated vehicle subsystem of a motor vehicle having an engine, a driven wheel, and a battery, comprising:
   a generator adapted to be driven by the vehicle engine to provide electrical energy to the vehicle subsystem and for charging the vehicle battery;
   a control unit for setting an input power provided to the generator by the vehicle engine; and
   at least one interface for connecting the vehicle subsystem to the control unit and for transferring power request signals of the vehicle subsystem to the control unit, wherein the control unit is configured to set the output voltage of the generator based on a power request of the vehicle subsystem, wherein the vehicle subsystem includes a transmission for transferring torque from the engine to the driven wheel and a comparator to compare a voltage available at the transmission with a threshold value, the vehicle subsystem being operable to transmit a power request signal via the interface to the control unit based on the comparison of the voltage to the threshold value.

2. An energy supply system in accordance with claim 1, wherein the control unit is configured to set the input power provided to the generator to set the output voltage of the generator.

3. An energy supply system in accordance with claim 1, wherein the transmission comprises a transfer case of an all-wheel drive vehicle.

4. An energy supply system in accordance with claim 3, wherein the transfer case includes an actuator for selectively applying a friction clutch, the actuator being activated during the switching procedure.

5. An energy supply system in accordance with claim 1, wherein the interface comprises a controller area network bus interface.

6. An energy supply system in accordance with claim 1, wherein the control unit is configured to determine whether a power request signal is to be expected from the vehicle subsystem based on a vehicle state, the output voltage of the generator being set to meet the expected power request based on the determination.

7. An energy supply system in accordance with claim 1, wherein the control unit is configured to set the input power provided to the generator based on a then currently required power for driving the vehicle in the absence of a power request from the vehicle subsystem.

8. An energy supply system in accordance with claim 1 wherein the power request signal is proportional to the amount of deviation between the threshold value and the onboard voltage for variably controlling the output voltage of the generator.

9. A method for supplying electrical energy to an actuator of a transmission for a vehicle, comprising:

determining a voltage available at the transmission actuator using a comparator coupled to the transmission of the vehicle;

comparing the determined voltage to a threshold value sufficient to drive the transmission actuator;

sending a power request signal from the comparator via an interface to a control unit of a generator when the voltage at the actuator is not greater than the threshold value and a transmission switching procedure is requested; and setting an output voltage of the generator to meet the power request.

10. A method in accordance with claim 9, further including setting an input power provided to the generator by the vehicle engine to set the output voltage of the generator.

11. A method in accordance with claim 9, wherein the control unit determines a vehicle state and whether a power request signal is to be expected based on the vehicle state and sets the output voltage of the generator to meet the expected power request of the vehicle subsystem.

12. A method in accordance with claim 9, wherein the control unit sets the input power provided to the generator based on a then currently required engine power for driving the vehicle.

* * * * *